(12) United States Patent
Yost et al.

(10) Patent No.: US 6,260,050 B1
(45) Date of Patent: Jul. 10, 2001

(54) SYSTEM AND METHOD OF ADAPTING AUTOMATIC OUTPUT OF SERVICE RELATED OLAP REPORTS TO DISPARATE OUTPUT DEVICES

(75) Inventors: Kyle N. Yost, Arlington, VA (US); Peter G. Wilding, Denver, CO (US); Robert G. Trenkamp, Washington, DC (US)

(73) Assignee: Microstrategy, Inc., Vienna, VA (US)

( * ) Notice: Subject to any disclaimer, the term of this patent is extended or adjusted under 35 U.S.C. 154(b) by 0 days.

(21) Appl. No.: 09/343,561

(22) Filed: Jun. 30, 1999

Related U.S. Application Data

(60) Provisional application No. 60/126,055, filed on Mar. 23, 1999.

(51) Int. Cl.[7] .............................. G06F 3/00; G06F 15/16
(52) U.S. Cl. ........................ 707/501; 709/200; 709/201; 709/232
(58) Field of Search ..................................... 707/501, 103, 707/1, 3, 513, 531; 709/200, 232, 201; 725/25

(56) References Cited

U.S. PATENT DOCUMENTS 5,604,528 * 2/1997 Edwards et al. ........................ 725/25
5,692,181 * 11/1997 Anand et al. ........................ 707/102

(List continued on next page.)

OTHER PUBLICATIONS

Relational OLAP Interface, Programmer's Reference and SDK Guide, Version 5.0, Aug. 1998.
Prospectus—4,000,000 Shares Microstrategy Class A Common Stock, Jun. 11,1998.
Data Warehouse Dossier, Fall 1998, pp. 1–10.
Media Ouput Book, v2.0, Feb. 16, 1999.
Microstrategy Products and Services, 1998.
Relational OLAP Interface for the Web, 1996.
Microstrategy Introduces DSS Broadcaster—The Industry's First Information Broadcast Server, Mar. 23, 1998, http://www.strategy.com/newsandevents/News/PressReleases/1998/broadcaster.htm.

(List continued on next page.)

Primary Examiner—Stephen S. Hong
Assistant Examiner—William L. Bashore
(74) Attorney, Agent, or Firm—Hunton & Williams

(57) ABSTRACT

A system for generation of output from an on-line analytical processing system to user output devices that comprises a service processor that processes at least one scheduled service in an on-line analytical processing system and generating a service output, each service comprising at least one query to be performed by the on4ine analytical processing system. The system then formats the service output according to styles specified for each user output device specified to receive that service output. The system then forwards the formatted service output to the user output devices specified for that service. The styles specified comprise a plurality of predefined parameters regarding the format for the service output for use by that user output device, including enclosure handling parameters and text grid parameters. The output may be formatted into multiple messages and may be formatted for an HTML mail system, an audio system, particular types of pager systems, electronic mail, web pages, mobile phones, telephones, facsimiles, personal digital assistants, and other electronic devices. A natural language formatting system may also be employed to generate natural language output.

15 Claims, 4 Drawing Sheets

U.S. PATENT DOCUMENTS

| | | | | |
|---|---|---|---|---|
| 5,724,525 | * | 3/1998 | Beyers, II et al. | 705/40 |
| 5,758,088 | * | 5/1998 | Bezaire et al. | 709/232 |
| 5,765,028 | * | 6/1998 | Gladden | 706/205 |
| 5,787,278 | | 7/1998 | Barton et al. | 707/1 |
| 5,852,819 | * | 12/1998 | Beller | 707/1 |
| 5,864,827 | | 1/1999 | Wilson | 705/35 |
| 5,867,153 | | 2/1999 | Grandcolas et al. | 345/326 |
| 5,872,921 | | 2/1999 | Zahariev et al. | 709/203 |
| 5,893,905 | * | 4/1999 | Main et al. | 705/11 |
| 5,918,225 | * | 6/1999 | White et al. | 707/3 |
| 5,918,232 | * | 6/1999 | Pouschine et al. | 707/103 |
| 5,933,816 | | 8/1999 | Zeanah et al. | 705/35 |
| 5,940,818 | * | 8/1999 | Malloy et al. | 707/2 |
| 5,956,693 | * | 9/1999 | Geerlings | 705/14 |
| 5,963,641 | | 10/1999 | Crandall et al. | 380/2 |
| 5,974,441 | * | 10/1999 | Rogers et al. | 709/200 |
| 6,012,066 | * | 1/2000 | Discount et al. | 707/103 |
| 6,012,083 | * | 1/2000 | Savitzky et al. | 709/202 |
| 6,023,714 | * | 2/2000 | Hill et al. | 707/513 |
| 6,038,561 | * | 3/2000 | Snyder et al. | 707/6 |
| 6,047,327 | * | 4/2000 | Tso et al. | 709/232 |

OTHER PUBLICATIONS

Microstrategy Announces Enhanced Versions of DSS Web and DSS Server, Oct. 26, 1998, http://www.strategy.com/NewsandEvents/news/pressreleases/1998/server5.5.htm.

Frequently Asked Questions About DSS Web, printed Feb. 23, 1999, http://www.strategy.com/products/Web/faq.htm.

Personalized Information Broadcast Server, 1998.

System Guide DSS Web Version 5.5, Feb. 1999.

Developer Guide DSS Web Version 5.5, Feb. 1999.

Kylanpaa, Markku, Mobile Multimedia White Paper [URL: http://www.vtt.fi/tte/projects/mobmulti/mobmulti.html], pp. 1–7, downloaded from Internet on Sep. 28, 2000, Oct. 1998.*

Ewen, Edward F. et al., Data warehousing in an integrated health system: building the business case, Proceeding of the ACM first international workshop on Data warehousing and OLAP, pp. 47–53, Nov. 1998.*

Zaiane, O.R. et al., Discovering Web access patterns and trends by applying OLAP and data mining technology on Web logs, IEEE International Forum on Research and Technology Advances in Digital Libraries, pp. 19–29, Apr. 1998.*

Kurz, A. et al., Data warehousing within intranet: prototype of a web–based executive information system, IEEE Database and Expert Systems Applications, pp. 627–632, Sep. 1997.*

Lehn, R. et al., Data warehousing tool's architecture: from multidimensional analysis to data mining, IEEE Database and Expert Systems Applications, pp. 636–643, Sep. 1997.*

* cited by examiner

SYSTEM AND METHOD OF ADAPTING AUTOMATIC OUTPUT OF SERVICE RELATED OLAP REPORTS TO DISPARATE OUTPUT DEVICES

RELATED APPLICATIONS

This application claims priority from U.S. Provisional application Ser. No. 60/126,055 filed Mar. 23, 1999 entitled "System and Method for Automatic Transmission of On-Line Analytical Processing System Report Output." This application is also related by subject matter to the following U.S. patent applications: "System and Method For Automatic Transmission of On-Line Analytical Processing System Report Output," appl. Ser. No.: 09/343,563, U.S. Pat. No. 6,173,310; "System and Method for Automatic Transmission of Personalized OLAP Report Output," appl. Ser. No.: 09/343,562, U.S. Pat. No. 6,154,766; "System and Method For Subscription Interfacing in an Automatic Broadcast OLAP Report System," appl. Ser. No.: 09/345,439; and "System and Method for Management of an Automatic OLAP Report Broadcast System," appl. Ser. No.: 09/345,440.

FIELD OF THE INVENTION

This invention relates to a system and method for automatic broadcasting of information derived from on-line analytical processing system reports to multiple types of subscriber output devices, including electronic mail, personal digital assistants (PDA), pagers, facsimiles, printers, mobile phones, and telephones, and formatting output for those devices using configurable parameters.

BACKGROUND OF THE INVENTION

The ability to act quickly and decisively in today's increasingly competitive marketplace is critical to the success of any organization. The volume of data that is available to organizations is rapidly increasing and frequently overwhelming. The availability of large volumes of data presents various challenges. One challenge is to avoid inundating an individual with unnecessary information. Another challenge is to ensure all relevant information is available in a timely manner.

One known approach to addressing these and other challenges is known as data warehousing. Data warehouses, relational databases, and data marts are becoming important elements of many information delivery systems because they provide a central location where a reconciled version of data extracted from a wide variety of operational systems may be stored. As used herein, a data warehouse should be understood to be an informational database that stores shareable data from one or more operational databases of record, such as one or more transaction-based database systems. A data warehouse typically allows users to tap into a business's vast store of operational data to track and respond to business trends that facilitate forecasting and planning efforts. A data mart may be considered to be a type of data warehouse that focuses on a particular business segment.

Decision support systems have been developed to efficiently retrieve selected information from data warehouses. One type of decision support system is known as an on-line analytical processing system ("OLAP"). In general, OLAP systems analyze the data from a number of different perspectives and support complex analyses against large input data sets.

There are at least three different types of OLAP architectures—ROLAP, MOLAP, and HOLAP. ROLAP ("Relational On-Line Analytical Processing") systems are systems that use a dynamic server connected to a relational database system. Multidimensional OLAP ("MOLAP") utilizes a proprietary multidimensional database ("MDDB") to provide OLAP analyses. The main premise of this architecture is that data must be stored multidimensionally to be viewed multidimensionally. A HOLAP ("Hybrid On-Line Analytical Processing") system is a hybrid of these two.

ROLAP is a three-tier, client/server architecture comprising a presentation tier, an application logic tier and a relational database tier. The relational database tier stores data and connects to the application logic tier. The application logic tier comprises a ROLAP engine that executes multidimensional reports from multiple end users. The ROLAP engine integrates with a variety of presentation layers, through which users perform OLAP analyses. The presentation layers enable users to provide requests to the ROLAP engine. The premise of ROLAP is that OLAP capabilities are best provided directly against a relational database, e.g., the data warehouse.

In a ROLAP system, data from transaction-processing systems is loaded into a defined data model in the data warehouse. Database routines are run to aggregate the data, if required by the data model. Indices are then created to optimize query access times. End users submit multidimensional analyses to the ROLAP engine, which then dynamically transforms the requests into SQL execution plans. The SQL is submitted to the relational database for processing, the relational query results are cross-tabulated, and a multidimensional result set is returned to the end user. ROLAP is a fully dynamic architecture capable of utilizing pre-calculated results when they are available, or dynamically generating results from atomic information when necessary.

The ROLAP architecture directly accesses data from data warehouses, and therefore supports optimization techniques to meet batch window requirements and to provide fast response times. These optimization techniques typically include application-level table partitioning, aggregate inferencing, denormalization support, and multiple fact table joins.

MOLAP is a two-tier, client/server architecture. In this architecture, the MDDB serves as both the database layer and the application logic layer. In the database layer, the MDDB system is responsible for all data storage, access, and retrieval processes. In the application logic layer, the MDDB is responsible for the execution of all OLAP requests. The presentation layer integrates with the application logic layer and provides an interface through which the end users view and request OLAP analyses. The client/server architecture allows multiple users to access the multidimensional database.

Information from a variety of transaction-processing systems is loaded into the MDDB System through a series of batch routines. Once this atomic data has been loaded into the MDDB, the general approach is to perform a series of batch calculations to aggregate along the orthogonal dimensions and fill the MDDB array structures. For example, revenue figures for all of the stores in a state would be added together to fill the state level cells in the database. After the array structure in the database has been filled, indices are created and hashing algorithms are used to improve query access times.

Once this compilation process has been completed, the MDDB is ready for use. Users request OLAP reports through the presentation layer, and the application logic layer of the MDDB retrieves the stored data.

The MOLAP architecture is a compilation-intensive architecture. It principally reads the pre-compiled data, and has limited capabilities to dynamically create aggregations or to calculate business metrics that have not been pre-calculated and stored.

The hybrid OLAP ("HOLAP") solution is a mix of MOLAP and relational architectures that support inquiries against summary and transaction data in an integrated fashion. The HOLAP approach enables a user to perform multidimensional analysis on data in the MDDB. However, if the user reaches the bottom of the multidimensional hierarchy and requires more detailed data, the HOLAP engine generates an SQL to retrieve the detailed data from the source relational database management system ("RDBMS") and returns it to the end user. HOLAP implementations rely on simple SQL statements to pull large quantities of data into the mid-tier, multidimensional engine for processing. This constrains the range of inquiry and returns large, unrefined result sets that can overwhelm networks with limited bandwidth.

As described above, each of these types of OLAP systems are typically client-server systems. The OLAP engine resides on the server side and a module is typically provided at a client-side to enable users to input queries and report requests to the OLAP engine. Current client-side modules are typically stand alone software modules that are loaded on client-side computer systems. One drawback of such systems is that a user must learn how to operate the client-side software module in order to initiate queries and generate reports.

Although various user interfaces have been developed to enable users to access the content of data warehouses through server systems, many such systems experience significant drawbacks. All of these systems require that the user connect via a computer system to the server system to initiate reports and view the contents of the reports.

Moreover, current systems require that the user initiate a request for a report each time the user desires to have that report generated. A particular user may desire to run a particular report frequently to determine the status of the report.

Further, reports may be extensive and may contain a large amount of information for a user to sort through each time a report is run. A particular user may only be interested in knowing if a particular value or set of values in the report has changed over a predetermined period of time. Current systems require the user to initiate the new report and then scan through the new report to determine if the information has changed over the time period specified.

These and other drawbacks exist with current OLAP interface systems.

SUMMARY OF THE INVENTION

An object of the invention is to overcome these and other drawbacks in existing systems.

Another object of the present invention is to provide a system that automatically broadcasts reports from an on-line analytical processing system to any type of electronic user output device.

Another object of the present invention is to provide a system that utilizes configurable code that enables the system to be readily adapted to output messages in the format of any type of electronic user output device.

Another object of the present invention is to provide a system that outputs messages to multiple types of pages, mobile phones, telephones, electronic mail systems, PDAs, and other electronic communications systems in that output device s specified format using configurable code with parameters specified for the particular device.

Such a system and method comprises a broadcast module that connects to an on-line analytical processing (OLAP) system comprising a server system for accessing information in one or more data warehouses to perform report analysis. The broadcast module may enable the defining of a service. A "service" as used herein should be understood to include one or more reports that are scheduled to be run against one or more data warehouses, relational databases, files in a directory, information from web or file transfer protocol sites or information provided by a custom module, by a server system. These services may be subscribed to by users or user devices to enable the broadcast module to determine who should receive the results of a service.

The broadcast module enables the creation of a service, the scheduling of the service, subscription of users to the defined services, generation of reports for the service, formatting of outputs of the service and broadcasting of messages based on the output for the service, among other functions. A subscription interface module may be provided to enable users to select the services they want to subscribe to, the schedule on which they want to receive the contents of the service, and the personalization criteria to use for personalizing their content. A personalization module may be provided that enables subscribers to personalize the content of an individual service to which the subscriber is subscribing or to all services to which the subscriber subscribes. The broadcast module may be connected to a plurality of user devices including a facsimile, printer, pager, mobile phone, telephone, electronic mail, PDA, and web page output.

According to these and other objects, a system is provided that provides a plurality of parameters regarding the format of how a particular output device receives and handles incoming messages.

According to one embodiment of the present invention, a system is provided for generation of output from an on-line analytical processing system to user output devices that comprises a service processor that processes at least one scheduled service in an on-line analytical processing system and generating a service output, each service comprising at least one query to be performed by the on-line analytical processing system. The system then formats the service output according to styles specified for each user output device specified to receive that service output. The system then forwards the formatted service output to the user output devices specified for that service. The styles specified comprise a plurality of predefined parameters regarding the format for the service output for use by that user output device, including enclosure handling parameters and text grid parameters. The output may be formatted into multiple messages and may be formatted for an HTML mail system, an audio system, particular types of pager systems, electronic mail, web pages, facsimiles, printers, telephones, and other electronic devices. A natural language formatting system may also be employed to generate natural language output.

According to one embodiment of the present invention, a system for automatically generating output from an on-line analytical processing system based on scheduled services specified by subscribers of the system is provided. The system processes scheduled services in an on-line analytical processing system with each service comprising at least one query to be performed by the on-line analytical processing system. The system then automatically forwards output from the services to one or more subscriber output devices specified for that service. Users may define new services, including the schedule of the services and the type, such as alert services or scheduled services, and may also subscribe to the services provided by the system. If an alert service is processed, the system may forward output only when one or more alert criteria are satisfied. Subscribers may be specified by a dynamic recipient list that is resolved each time the service is processed to determine recipients of the service output. A dynamic recipient list may be, for example, a list that determines the recipients of a service based on dynamically resolved criteria. For example, a bank may generate a list every month that identifies customers who have an account balance greater than $100,000 and who have not made a transaction within the last three months. The output devices the system may forward output to may comprise electronic mailbox, facsimile, printer, mobile phone, telephone, pager, PDA or web pages.

According to another embodiment of the present invention, a system that enables subscribers to personalize services used for automatically generating output from an on-line analytical processing system is provided. In addition to enabling subscribers to specify the content and schedule of one or more services, the system enables subscribers to personalize various other parameters relating to the service. For example, subscribers may specify the format of service output, filters to be applied to the service, and a variety of other personalization options described in greater detail below.

According to another embodiment of the invention, the system utilizes static recipient lists ("SRL") and dynamic recipient lists ("DRL") for determining subscribers to a service. SRLs may be a list of manually entered subscriber names of a particular service. DRLs, however, may be a report generated by the system listing subscriber names that meet a predetermined criteria for a service. DRLs enable lists of subscribers to change according to certain criteria applied to contents of a database. For example, a DRL may be used to broadcast a sales report to only those subscribers who are managers of stores who have not met a predetermined sales goal.

Other objects and advantages of the present invention will be apparent to one of ordinary skill in the art upon reviewing the detailed description of the present invention.

DETAILED DESCRIPTION OF THE PREFERRED EMOBIDMENTS

Figure 1:
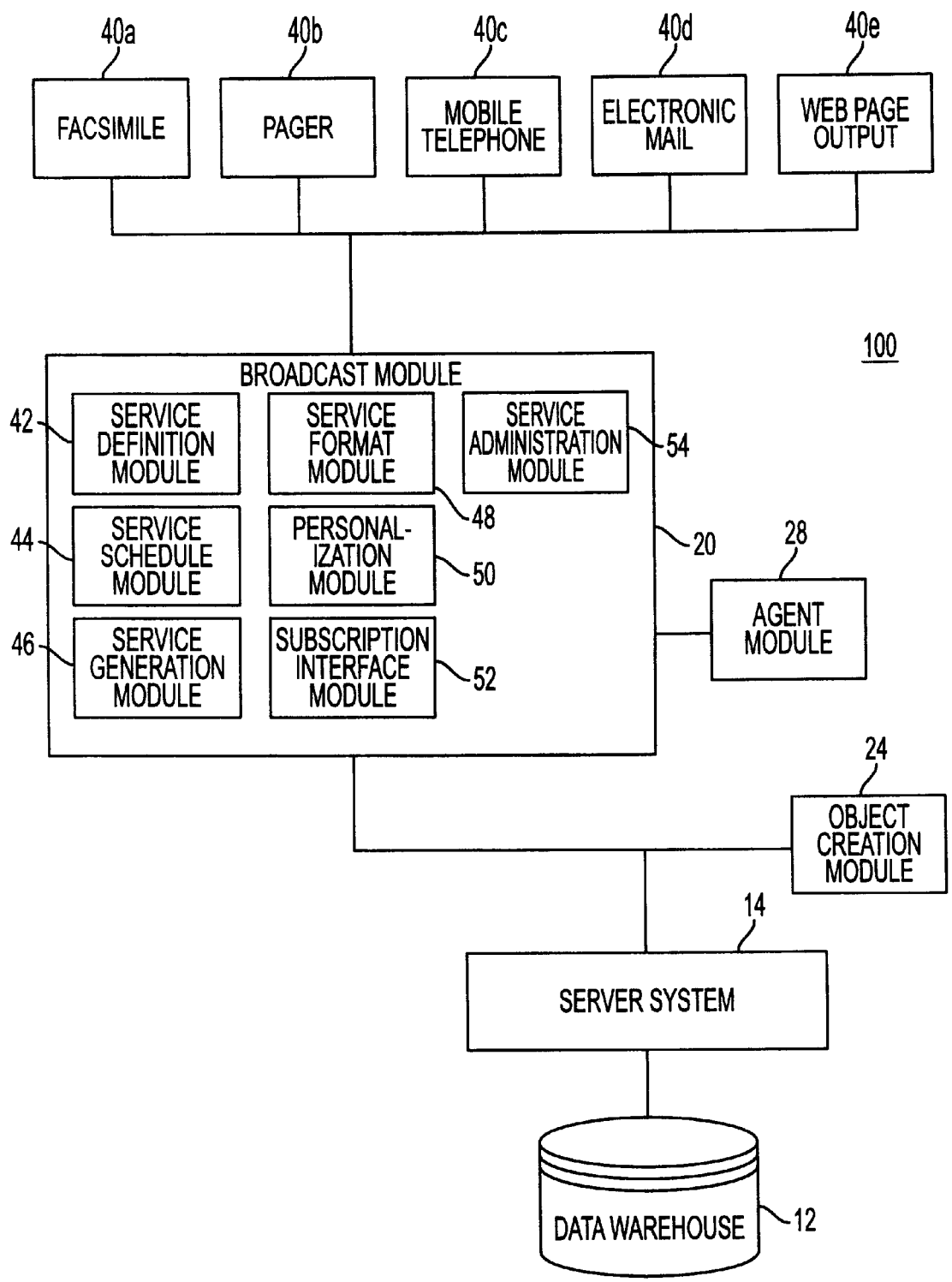
FIG. 1 is a schematic block diagram of a system in accordance with an embodiment of the present invention.
Figure 2:
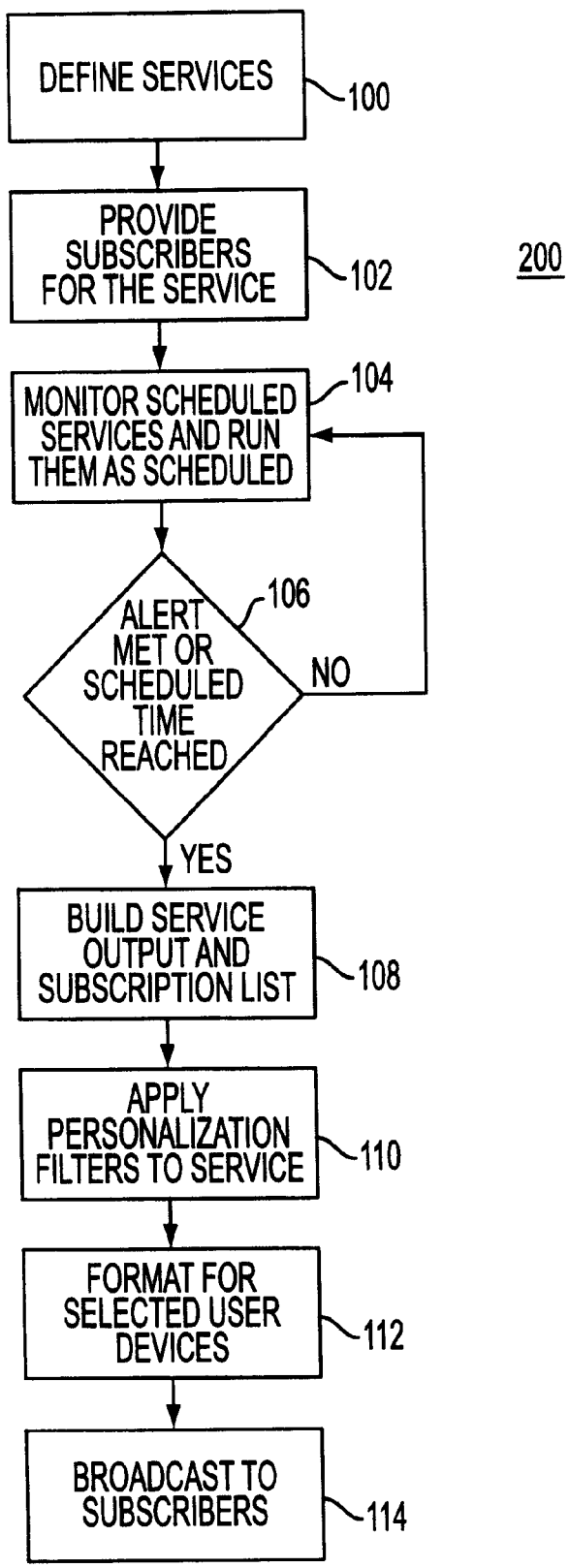
FIG. 2 is a schematic block diagram of a method for automatic transmission of OLAP report information.

According to one embodiment of the present invention, a system is provided for automatic transmission of OLAP report output to one or more of a plurality of user output devices. FIG. 1 depicts an embodiment of a system 100 according to the present invention. System 100 may comprise a data warehouse 12, a server system 14, a broadcast module 20, an object creation module 24, an agent module 28, and one or more user devices 40. User devices 40 may comprise a facsimile 40a, pager 40b, mobile telephone 40c, electronic mail 40d, and web page output 40e.

Broadcast module 20 may comprise a module that broadcasts personalized information derived from the OLAP system (e.g., data warehouse 12 and sever system 14) to users via one or more user devices 40 such as electronic mail, facsimile, printer, pager, mobile phone, telephone, PDA, and multiple other types of user information devices. Broadcast module 20 enables users to define services (e.g., queries and reports) that are to be run against an OLAP system such as server system 14 and data warehouse 12 based on a predetermined schedule. A "service" as used herein should be understood to include one or more reports that are scheduled to be run against data warehouse 12 by server system 14. Broadcast module 20 also enables users on the system to subscribe to one or more services and then broadcast module 20 outputs the results of these services to subscribers according to criteria established by the subscribers.

Broadcast module 20 may generate output to a plurality of different types of output devices. Broadcast module 20 interacts with multiple types of output modules. The output modules may include Mail/Messaging Applications Programming Interface (MAPI) (e.g., for Rich Text Format (RTF) electronic mail), Simple Mail Transfer Protocol (SMTP) (e.g., for markup language documents), facsimiles, pager service provider application program interfaces, mobile phone networks, wireless access protocols, Object-Oriented Database Connectivity (ODBC), HyperText Transfer Protocol (HTTP) posts, flat files, printers, or output modules customized by a user.

In one embodiment, a styles module may be provided. The styles module may enable system administrators or users to specify the formatting requirements of a user device 40 so that broadcast module 20 may generate output to that device in a manner that users can understand. Each style may be designed to suit particular users' needs and may be generally provided for a particular brand or type of device. For example, different styles may be defined for each different type of pager, facsimile output devices, and different types of electronic mail systems. Styles may thus be specified for various output devices including electronic mail, pagers, facsimiles and mobile telephones.

Rather than hard-coding the format of each possible output device, the present invention provides a plurality of styles parameters that may be modified for each particular style. This may be accomplished using the styles module. The parameters for each particular user device 40 may then be provided and broadcast module 20 may be able to output information to user device 40 based on the values provided for the parameters provided. In this way, the system is configurable to new devices and different device formats by specifying values for the parameters that satisfy that device.

Specifically, the styles module formats may include a plurality of parameters including general parameters, enclosure handling parameters, text grid parameters, and advanced formatting parameters. Each group of parameters may comprise a plurality of properties. The general parameters may comprise the following properties and sample value ranges: name (any string up to 50 characters), description (text grid up to 5000 characters), display width (e.g., total number of characters available on a row of the display) (1–9999 or unlimited), segment size (e.g., maximum number of characters that can be in a single message) (1–9999 or unlimited), URLs allowed (e.g., whether URL outputs are allowed in the message) (True/False, i.e., T/F), URL unavailable message (e.g., whether message which is inserted in place of the URL tag when the URL cannot be created because of personalization issues) (text string up to 248 characters), body element separator (e.g., character string which separates an alert element/value from the next) (any valid character plus carriage return for the device), supports Rich Text Format (RTF) (e.g., dictates whether RTF codes are to be stripped from the body of the message before it is sent) (T/F), default style (e.g., determine whether a style is the default style) (Y/N), truncate alerts (e.g., alert rows that do not completely fit in a segment entirely moved to the next segment) (T/F), fill row (e.g., appends spaces to an alert or grid row to force the next row onto a new line) (T/F), body element separator (e.g., string which separates an alert element/value from the next) (valid character string up to 20 characters or carriage return), and truncation character (e.g., user specified character that is used to segment messages) (valid characters).

Enclosure handling parameters may comprise the following properties and valid values for each: enclosure flag (e.g., indicates whether enclosures should be sent) (T/F), convert enclosure (e.g., indicates that if convert enclosures is true, the enclosures generated by the broadcast module should be put into the message itself (for example, all Excel grids should be converted to text grids or discarded if in a non-standard format, such as a Word document)) (T/F), enclosure removed message (ERM) (e.g., if enclosure flag is not true, this ERM is placed into the outgoing message in place of the enclosure) (valid text string up to 248 characters), attachment placement (e.g. places attachments in a specified location instead of mail server default) (end, offset by user specified number of carriage returns), and enclose facsimile RTF (e.g., converts RTF to attachment for broadcast via facsimile) (T/F).

Text grid parameters may comprise the following properties and sample values: column pad (e.g, character placed immediately after a column element's data so that all columns line up properly) (null, space, or valid character), column separator (e.g., character used to delimit a column) (null, space, tab or valid character), grid space (e.g., character used to replace the space character everywhere in a grid) (null or any valid character), column overflow character (e.g., character separating columns when displayed in overflow mode) (null, space, tab or valid character), and truncate rows (e.g., grid rows that do not completely fit in a segment may be entirely moved to the next segment) (T/F).

Advanced formatting parameters may include the following properties and sample values: subject line length (e.g., number of characters on the subject line) (0–250), subject pad (e.g., character used to stuff the subject line to its maximum length) (null, space or valid character), subject space (e.g, character used to replace the space character everywhere in the subject) (null, or valid character), truncation string (e.g., indicates that some data has been cut off and may appear at the end of every segment except the last one) (null, text string up to 20 characters), maximum segments (e.g, indicates the maximum number of chunks in which the data can be sent) (e.g., 0–9999 or unlimited), CR replacement (e.g., replaces each vbCrLf to force carriage returns on the output medium and may be used as a row separator for a text grid) (carriage return, null, space, tab or valid character), body subject (e.g., places message body in subject (for some mobile phones), message subject in body (e.g., for pagers that do not support subject lines)) (T/F), segment prefix (e.g, string attached to beginning of each segment) (null, valid text string up to 20 characters, carriage return, space, segment number, date/time sent), and message body in subject (e.g., places message in subject line (for some mobile phones)) (T/F).

The value of the properties described above may be used by the styles module to format the output to be sent to the output device defined for that style. The segment module may perform the following steps based on the value of the properties in each of these parameters for the particular style to receive the output message.

Padding and formatting of the message may be performed as specified in the properties and then character removal and replacement may be performed on the message body generated by broadcast module 20 from the server module. The message size may then be compared to the allowable size to determine whether segmentation is necessary.

If so, the following steps may be performed for segmentation. First, the last possible break character is determined (this character may be the position given by the start of the segment plus the segment size minus the length of the truncation string). The module then looks for the first character before the last possible character that makes the most sense for breaking.

To determine the character for breaking, the module first determines what is the newline indicator in this message. If carriage returns have been replaced, then the carriage return replacement character is the newline indicator and, if not, then the carriage return is the newline indicator.

If the newline indicator immediately precedes the last possible break character, then the newline indicator is the place for the break-in segments. If not, then the styles module defines a search zone of characters up to and including the last possible break character. The number of characters in the search zone may be the minimum of the display width of the style or one third of the allowable length of the segment (segment size minus length of truncation string). If a newline indicator is in the search zone, then the styles module takes the last newline indicator in the search zone and places the break immediately before it. If no newline indicator is found, then the styles module looks for spaces or tabs. The first space or tab preceding the last possible break character is then selected as the break point. If no such space or tab is in the search zone, then the break point is between the last possible break character and the next character. The start of the next segment is the first character after the break point that is not a space, tab, or part of a newline indicator.

A truncation string may be placed in each segment to indicate that information has been truncated due to limits on the number of segments that the output is to receive. That way, the user may be informed that additional information was not sent that may be important and that the user may desire to check the full report or request that the report be resubmitted with all of the information (ie., an override on the limit of segments).

If the subject-in-body property is true has been selected, then the module concatenates the subject and body text of the message with a space in between and places this in the body of the message. If the body-in-subject property is true, then the module concatenates the subject and body of the message with a space in between, and places this in the subject line. The body may be truncated to fit the subject size limitations.

The styles module may operate with the broadcast module 20 in an environment as depicted in FIG. 1. In such a system, data warehouse 12 may comprise any data warehouse or data mart as is known in the art, including a relational database management system ("RDBMS"), a multidimensional database management system ("MDDBMS") or a hybrid system. Server system 14 may comprise an OLAP server system for accessing and managing data stored in data warehouse 12. Server system 14 may comprise a ROLAP engine, MOLAP engine or a HOLAP engine according to different embodiments. Specifically, server system 14 may comprise a multithreaded server for performing analysis directly against data warehouse 12. One embodiment of server system 14 may comprise a ROLAP engine known as DSS Server™ offered by MicroStrategy. Accordingly, data warehouse 12 and server system 14 comprise an OLAP system that connects to broadcast module 20 for broadcast of user-specified reports from data maintained by data warehouse 12.

Broadcast module 20 may also be connected to an agent module 28 which may also be connected to server system 14. Agent module 28 may be provided to define reports and queries that may be selected as part of one or more services by broadcast module 20. Agent module 28 may be used to define queries to be performed against the data contained in data warehouse 12 using components, templates, filters, reports, agents, etc. Components may include dimensions, attributes, attribute elements, and metrics—in other words, the building blocks for templates, filters, and reports. Templates generally define a report format and specify the attributes, dimensions, metrics, and display properties comprising a report. Filters generally qualify report content and identify a subset of data warehouse 12 to be included in a report. For example, filters may be used with set math, multidimensional qualifications, and metric qualifications. Using set math, users can define and embed any set of limiting criteria (e.g, union, intersect, exclude). Multidimensional qualifications enable users to indicate general subject areas or perspectives on data (e.g., time, geography, product). Metric qualifications may be used to compute mathematical calculations of various numerical data (e.g., total sales, profit, cost, percent change, profit). Metrics may be displayed in a variety of formats (e.g., percentages, currency, fonts indicating predetermined values). Reports are generally understood to be a data analysis created by combining a template (the format) with a filter (the content). Agents may be a group of reports cached on a time- or event-based schedule for rapid retrieval and batch processing. According to one embodiment of the invention, agent module 28 may comprise a software package known as DSS Agent™ offered by MicroStrategy.

Agent module 28 may operate on any user system 26 including personal computers, network workstations, laptop computers or any other electronic device connected to server system 14 or may comprise an object connected to broadcast module 20.

Broadcast module 20 therefore, cooperates with server system 14 and agent module 28 to send personalized information to users at predefined intervals or when criteria specified in reports defined through either broadcast module 20 or agent module 28 exceed predefined thresholds. To provide this functionality, broadcast module 20 enables users of the system to create services that run against the OLAP system to generate information and subscriptions that specify the recipients of the information derived from a service. A service may comprise one or more reports that are processed by the OLAP system and may be a specific report, series of reports or elements within a report. Also, subscribers may include users, groups of users or only specific user devices 40 for a particular user. Services may be based on predefined reports from broadcast module 20 or agent module 28 or may be based on filter/template combinations set up through broadcast module 20 and/or agent module 28.

Once services have been defined and subscribers to that services are established, broadcast module 20 continually monitors the schedules for the services, runs the scheduled reports, and automatically generates outputs where conditions specified in the service are satisfied using push technology. Outputs from broadcast module 20 may be personalized to subscriber demands and/or formatted to meet a subscriber's user device requirements to ensure that users see only that portion of a report that is relative to that user and in a manner that is most useful for the user. Accordingly, a user can thus have up-to-date information about the contents of data warehouse 12 without having to submit a query or log-in to a software module on the user system.

To provide the functionality described above, broadcast module 20 may comprise a plurality of modules that perform certain functions. Although described as separate modules, it should be understood that such modules may be combined or separated further. In an embodiment of the present invention, as depicted in FIG. 1, broadcast module 20 may comprise a service definition module 42, a service schedule module 44, a service generation module 46, a service format module 48, a personalization module 50, a subscription interface module 52, and a service administration module 54.

Service definition module 42 of broadcast module 20 may comprise a module for enabling a user to create or modify a service. In an embodiment, the services may be defined based on reports or workbooks specified in agent module 28. Users may then subscribe to services defined in service definition module to enable broadcast module 20 to determine who should receive the results of a service.

At least two types of services may be provided—scheduled services and alert services. A schedule service may comprise a service that generates information to subscribers at a given time interval. An alert service may comprise a service that provides information to all subscribers if an alert condition is true.

Service schedule module 44 may provide the functionality to enable selection of when a service should be run. Service schedule module 44 may enable a user, administrator or other person having access thereto to specify the frequency that the service should be performed. The schedule may be based on an interval (such as every several hours, days, weeks, months, years, etc.) or on one or more specified days (such as March 15th and September 15th). Other methods of scheduling events to be processed may also be used.

Service generation module 46 may comprise a module for following a schedule set by service schedule module 44 and completing the operation specified in service definition module 42. For example, if a service were specified to run the monthly sales totals for the Midwest region of a company every weekend and generate an alert to the supervisor on Monday morning if sales drop below 5%, then service generation module 46 would be responsible to monitor the schedule of this service to ensure that the report contained therein was processed over the weekend and then generate an alert report if the criteria set in the service is satisfied. To monitor the schedule of all services specified by broadcast module 20, service generation module 46 may operate constantly to ensure that every scheduled service is completed.

Service format module 48 may be responsible for taking the results of a service and formatting it to a proper format corresponding to each of the subscribers of a particular service. Service format module 48 may be responsible for formatting service results for generation to user devices 40*a*–40*e*.

Personalization module 50 may be provided to enable subscribers to specify the content for a service in which they are interested. Users may input personalized choices for personalization module 50 through subscription interface module 52 by selecting personalization filters from filters available in the service. Personalization module 50 captures the criteria selected by the user and creates a subscription based on the selected criteria which may be multidimensional based on the data structure in the data warehouse, relational database, etc. Because personalization module 50 enables subscribers to specify the content of a service, this reduces the amount of data output to a subscriber by providing the subscriber with data that the subscriber is interested in.

Personalization may also be set in an address book module maintained by broadcast module 20. The address book may comprise an entry for each subscriber of any service on the system. That subscriber may define global personalization filters to be applied to all services to which the subscriber applies rather than providing personalization on only a service by service basis. For a chosen user, personalization may also be set on a project level basis. For example, a project may comprise multiple reports. Each report within a project may have different personalized filters applied according to user desires. Personalization module 50, however, also enables subscribers to personalize the entire rather than doing so for each. For example, subscribers may assign particular operations to be performed for each of the reports within a project. This enables subscribers to personalize multiple reports simultaneously.

Additionally, subscribers may personalize style parameters using, for example, personalization module 50. Styles may be used to tailor a display format of a report to a particular device (e.g., pager, electronic mail, facsimile). Styles may be designed according to the needs of each subscriber depending on the characteristics and properties of a recipient. For example, a user may desire to have pages generated from the report sent in a particular format and may set up that format using styles.

Further, in the address book, the data warehouse login and password may also be stored to enable access to the data warehouse. Each subscriber may have multiple addresses in the address book, each address assigned to a different output device. Thereby, a subscriber may have multiple addresses, each of which may be assigned to receive different services based on different filters, etc. This provides for the ultimate in customization for receipt of information. For example, a user may desire to get stock information via pager but sales information via e-mail. By setting up two separate addresses and applying different services and/or filters, that may be accomplished according to the present invention.

Subscription interface module 52 may be provided to enable users or administrators of the system to monitor and update subscriptions to various services provided by broadcast module 20. Service administration module 54 may be provided to provide administrative functions to monitor a queue to schedule services and to provide throughput of services to ensure efficient completion of those services by broadcast module 20.

Subscription interface module 52 may be used to create a subscriber list by adding one or more subscribers to a service. Users or system administrators having access to broadcast module 20 may add multiple types of subscribers to a service such as a subscriber from either a static recipient list (SRL) (e.g., addresses and groups) or a dynamic recipient list (DRL) (described in further detail below). The subscribers may be identified, for example, individually, in groups, or as dynamic subscribers in a DRL. Subscription interface module 52 permits a user to specify particular criteria (e.g, filters, metrics, etc.) by accessing data warehouse 12 and providing the user with a list of available filters, metrics, etc. The user may then select the criteria desired to be used for the service.

A SRL is a list of manually entered names of subscribers of a particular service. The list may be entered using service administration module 54 or subscription interface module 52. SRL entries may be personalized such that for any service, a personalization filter (other than a default filter) may be specified. A SRL enables different personalizations to apply for a login alias as well. For example, a login alias may be created using personalization module 50. Personalization module 50 enables subscribers to set preferred formats, arrangements, etc. for displaying service content. The login alias may be used to determine a subscriber's preferences and generate service content according to the subscriber's preferences when generating service content for a particular subscriber.

DRL may be a report which returns lists of valid user names based on predetermined criteria that are applied to the contents of a database such as data warehouse 12. Providing a DRL as a report enables the DRL to incorporate any filtering criteria desired, thereby allowing a list of subscribers to be derived by an application of a filter to the data in data warehouse 12. In this manner, subscribers of a service may be altered simply by changing the filter criteria so that different user names are returned for the DRL. Similarly, subscription lists may be changed by manipulating the filter without requiring interaction with service administration module 54. Additionally, categorization of each subscriber may be performed in numerous ways. For example, subscribers may be grouped via agent filters. In one specific embodiment, a DRL is created using DSS Agent™ offered by Microstrategy.

Service administration module 54 enables monitoring of reports (e.g., ability to see who is using system, what reports they are generating, etc.), scheduling of reports, address book and dynamic recipient list maintenance, and subscriber management. Subscriber management involves enabling system administrators to review, access, and generate information about subscribers to the system through the maintenance of detailed subscriber lists including the DRL's and SRL's. This list may track information on which subscribers subscribe to which services and vise-versa.

Figure 3:
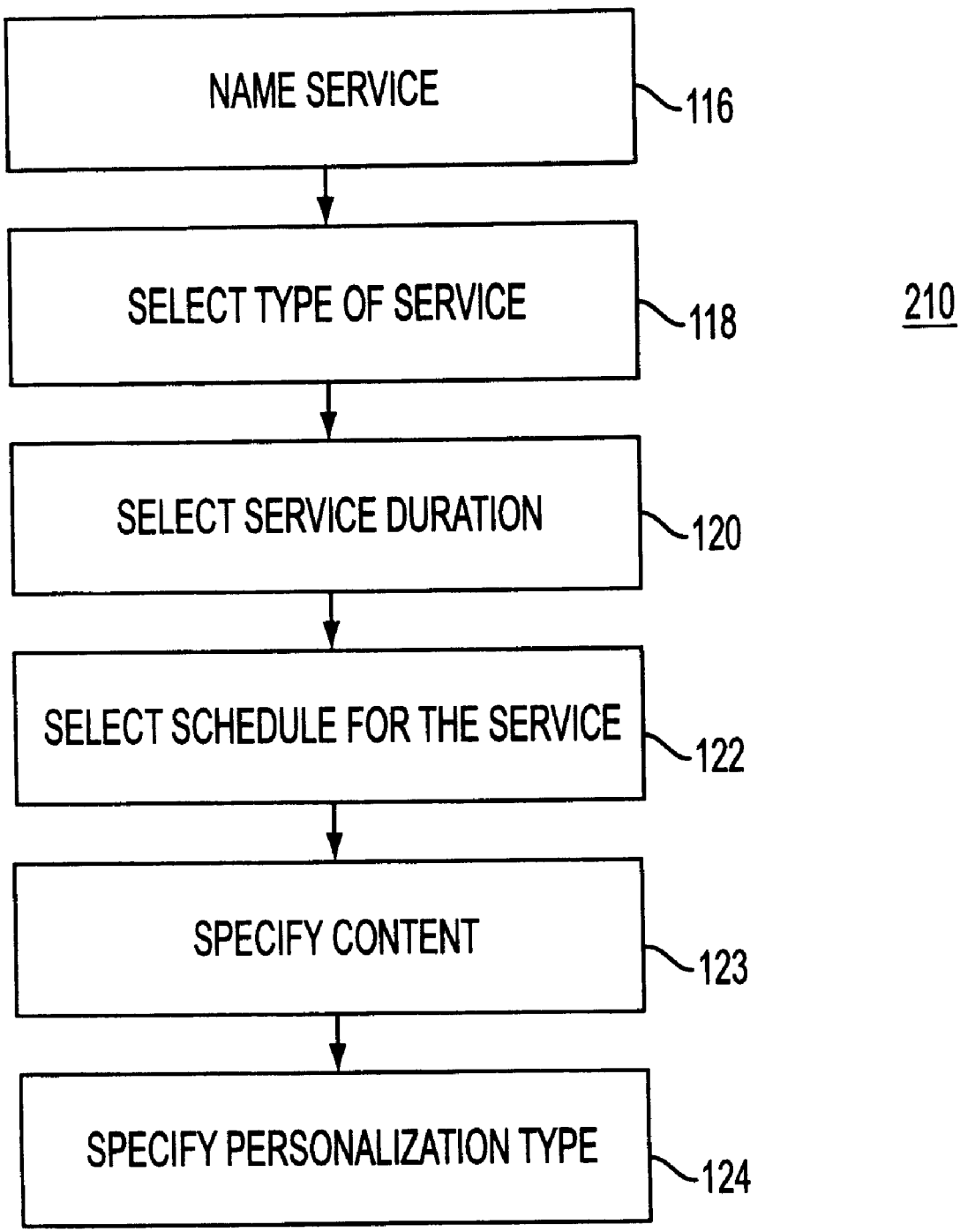
FIG. 3 is a schematic block diagram of a method for creating a service according to an embodiment of the present invention.

A method 200 of operation of system 100 is provided in FIG. 3. Method 200 comprises several steps for generating information to a plurality of user systems using "push" technology. In step 100, one or more services are defined by users or system administrators for broadcast module 20 to monitor, as described in more detail below with respect to FIG. 4, such as through service definition module 42. In step 102, subscribers for each of these various services are provided, such as through subscription interface module 52. In step 104, the system monitors and processes services according to their defined schedules. Step 104 may be performed by service schedule module 44, and/or service generation module 46, for example.

In step 106, the system determines whether an alert criteria has been met or if a scheduled service has been completed, such as through service generation module 46. If an alert criteria has not been satisfied or a scheduled service has not completed, the system continues to monitor and process services. If an alert condition has been met, or if a scheduled service has been completed, in step 108, the system, such as through service generation module 46, builds the service output and the subscription list for that particular service. Building the subscription list for a service may involve using a recipient list resolution method. For example, a recipient list resolution (RLR) may be used to build a list of all of the subscribers to a service in step 108. This may be performed by resolving and merging all DRLs with all SRLs for a given service. All DRLs are generated and the resulting list is merged with the SRL. Typically, there is only one SRL (although additional SRLs may be used) and none to numerous DRLs per service. The list that results from merging all of the DRLs and SRLs produces a list which consolidates all subscribers of a given service.

Next, in step 110, the system, such as through personalization module 50, applies personalization filters to services that are scheduled to be output to the subscribers. Personalization filters may modify the output of a service according to the subscriber's desired criteria. The personalized outputs may then be formatted for the user device 40 selected by the user for output. Additionally, personalization module 50 may also be used to personalize the contents of one or more services as described above. In step 114, broadcast module 20 broadcasts the formatted and personalized services to subscribers at user devices 40a–40e.

Figure 4:
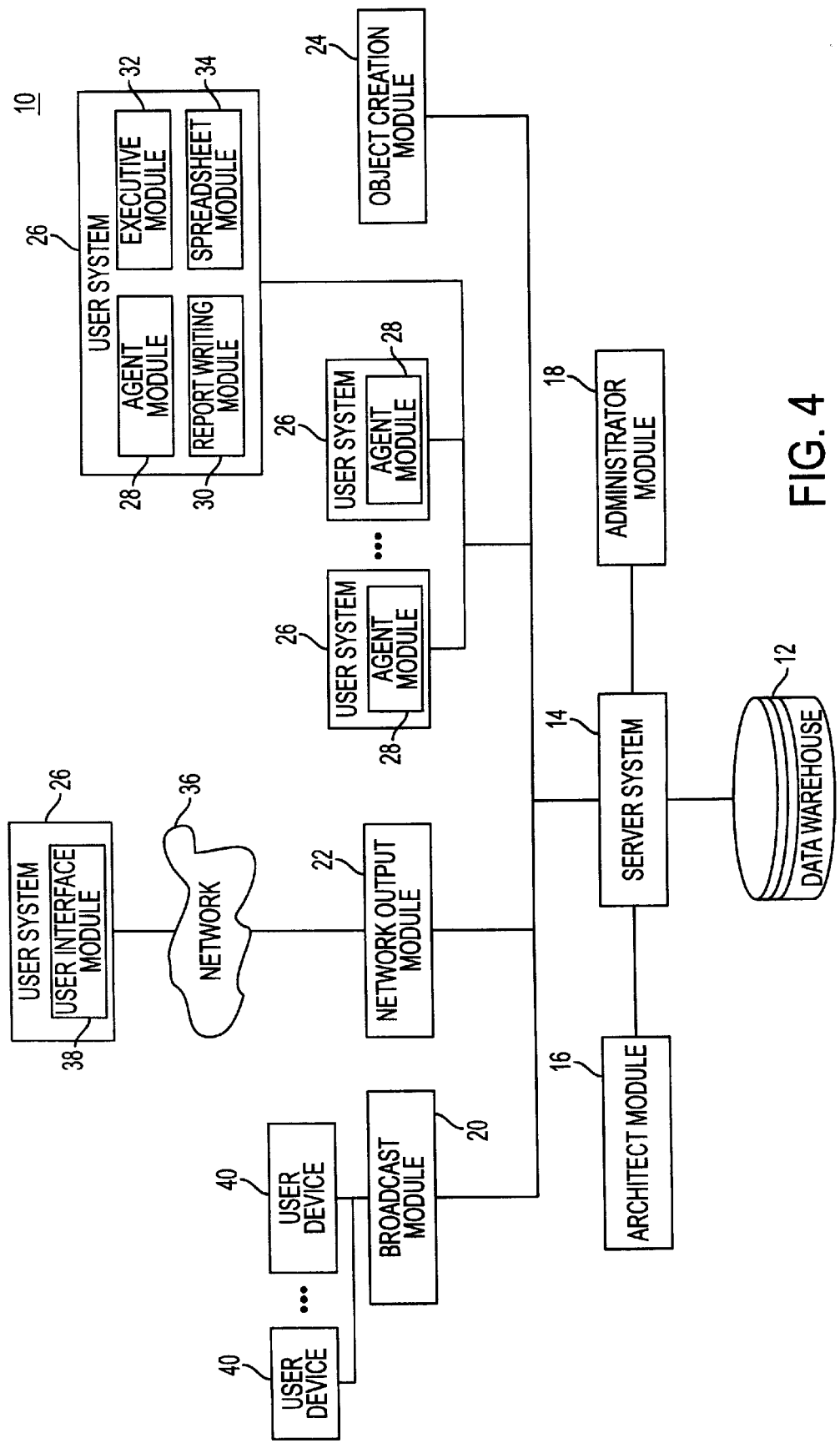
FIG. 4 is a schematic block diagram of an overall system in accordance with an embodiment of the present invention.

As described above, step 100 defines the service or services to be monitored by broadcast module 20. FIG. 4 depicts a method 210 according to one embodiment of the present invention for performing step 100. According to one embodiment, in step 116, a user may name and provide a description of the service or services to be monitored. By providing a name and description, users may be able to uniquely identify the services from an object browser or in a service queue.

Next, in step 118, the user selects the type for the service. As described above, at least two types of services may be provided. A first type, a scheduled service, is a service that is run according to a predetermined schedule and output is generated each time the service is run. An alert service is one that is run periodically as well, however, output is only generated when certain alert criteria is satisfied. If an alert service is selected by the user, the user may then specify a report or a template/filter combination upon which the alert is based. According to one embodiment, reports and template/filter combinations may be predefined by other objects in the system including agent module 28 or object creation module 24. For example, agent module 28 such as the DSS agent™ offered by MicroStrategy, may be used to create and define reports with filters and template combinations, and to establish the alert criteria that are to be used for an alert service.

Next, in step 120, the duration of the service is input by the user. Service duration indicates the starting and stopping dates for the service. The start date is the base line for the scheduled calculation, while the end date indicates when the broadcast will cease to be sent. The user has the option of starting the service immediately or waiting until some time in the future. Various calendaring features may be provided to enable the user to easily select these start and stop dates. For example, a calendar that specifies a date with pull-down menus that allow the users to select a month and year may be provided according to known methods of selecting dates in such programs as electronic calendaring programs and scheduling programs used in other software products. One specific aid that may be provided is to provide a calendar with a red circle indicating the present date and a blue ellipse around the current numerical date in each subsequent month to more easily allow the user to identify monthly intervals. Other methods may also be used.

Next, in step 122, the user selects the schedule for the service. According to one embodiment, predefined schedules for services may be provided or the user may choose to customize the schedule for the service. If the user desires to create a new schedule, a module may be opened to enable the user to name the schedule and to set the parameters for the schedule. Schedules may be run on a several-minute, hourly, daily, monthly, semi-annual or annual basis, all depending upon what frequency is desired.

The next step, step 123, may be performed to enable the user to specify the content of a service. The content of a service is the various information reports and template/filter combinations that the server system 14 processes using the data in data warehouse 12 in order to provide the output requested for that particular service. The content of a service may comprise many different items or combination of items to suit the user's needs. For example, the user may be able to include a text grid, an agent alert, a web uniform resource location (URL), a spreadsheet container, a new sheet container, a text container, a text message, contents from a text file, or a file attachment. According to one embodiment, the system may organize these various contents into containers. A broadcast container may comprise the highest level container under which all content pieces reside. A grid may comprise an element that is associated with a report or a template/filter combination. The grid may be bound via a macro to a report/filter and template combination. An agent alert may be associated with a particular report that is therefore incorporated within the service. Any report available on agent module 28 may be selected. The web URL item may be associated with the report through network output module 22 that specified that URL for the particular report. A spreadsheet container may be the parent of an embedded spreadsheet attachment. When created, a particular spreadsheet may be included as a child. Additionally, markup language (e.g., XML and/or HTML) documents may also be included.

After the user has named the service, selected the type, duration, and schedule for the service, the user may select the personalization type in step 124. For example, the user may select an option to either prevent personalization, require personalization, or allow personalize optionally. Upon completion of these steps, the service may be stored by service definition module 42 in a database structure to enable users to retrieve predefined services to subscribe to these services through subscription interface module 52.

Method 210 may also comprise an error condition step. An error condition step may be used to enable users to specify "error" conditions and actions. For example, an "error" condition may be a user notification that a server is "down" or that there is no data to be returned. A user may specify particular actions to be performed by the system in response to one or more error conditions. For example, a user may specify a "server" error (e g, not responding) and indicate a particular action to be performed in response to a "server not responding" error (e.g., reattempt in a predetermined time). Various other conditions and actions may be specified.

Broadcast module 20 may also comprise a text-to-speech module that converts text into speech for output to speech devices such as telephones, answering machines, phone mail, and the like. Technologies for converting text to speech are known but the implementation of such a system in connection with a OLAP broadcast system has not been implemented until the present invention.

Further, a generated output message may comprise HTML Mail according to an embodiment of the present invention. A HTML Mail output module may be provided for generating output in HTML Mail format to enable viewers to receive more usable electronic mail messages. HTML Mail generation devices are known. The present invention provides general and customized HTML mail output by using, for example, the universal web data formatting capabilities of XML/XSL based design.

The present invention may convert reports into natural language outputs for more understandable information supply to subscribers. Pre-structured sentences and data fills and dynamic sentence construction may be provided as functionality in broadcast module 20. The natural language capabilities of the agent module may be leveraged in this embodiment.

The system described may also comprise a portion of a larger decision support system 10 as depicted in FIG. 4. System 10 may comprise a data warehouse 12, a server system 14, an architect module 16, an administrator module 18, a broadcast module 20, a network output module 22, a plurality of user systems 26, and an object creation module 24. User systems 26 may comprise an agent module 28 as described above.

Agent module 28 may enable a user access to the contents of data warehouse 12 to provide detailed analysis on an ad hoc basis. One of the advantages of DSS Agent™ includes its use of a ROLAP architecture on server system 14 and a RDBMS in data warehouse 12 to provide a more scaleable environment. Through DSS Agent™, a user can "drill down." Drilling down allows the user to dynamically change the level of detail in a report to a lower level attribute so that the resulting report displays data with a greater level of detail. For example, one can drill down from year to month to week to day. DSS Agent™ also enables users to "drill up" to a higher level attribute. Drilling up summarizes the selected data to a higher level total. For example, one can drill from day to week to month to year. DSS Agent™ also enables a user to "drill within." Drilling within allows a user to go to a different hierarchy within the same dimension. Drilling within is often used to examine the characteristics of selected data. For example, drilling within enables a user to drill from item to color when looking at a particular retail item such as an automobile, clothing or the like. Drilling across allows the user to drill to an altogether different dimension. For example, one can drill across from a region to a month. Accordingly, through use of agent module 28, server system 14, and data warehouse 12, drilling is a powerful tool that is easily implemented using a ROLAP architecture which is not as easily accessible in MOLAP.

Architect module 16 may comprise a module that enables developers to create and maintain data and metadata in data warehouse 12. Metadata may be considered to be data about data, such as data element descriptions, data type descriptions, attributes/property descriptions, range/domain descriptions, and process/method descriptions. Data and metadata stored in data warehouse 12 may thus be modified and organized by architect module 16. According to one embodiment of the invention, architect module 16 may comprise a software package known as DSS Architect™ offered by MicroStrategy.

Administrator module 18 may comprise a module for facilitating the development, deployment, and management of data warehouse applications supporting large volumes of users over various distribution mechanisms. Administrator module 18 may comprise an object manager and a warehouse monitor. The object manager allows objects to be shared across databases for easy migration from development to production. The warehouse monitor provides performance monitoring and management tools to support thousands of users across a distributive database environment. The warehouse monitor collects statistics for the purpose of identifying performance bottlenecks, warehouse tuning, cost analysis and various other purposes. According to one embodiment of the invention, administrator module 18 may comprise a module known as DSS Administrator™ offered by MicroStrategy.

Server system 14 may also connect to an object creation module 24. Object creation module 24 may comprise an open object linking and embedding ("OLE") application program interface ("API") for custom decision support development. According to one embodiment of the invention, object creation module 24 may comprise a software module known as DSS Objects™ offered by MicroStrategy. Additionally, custom applications may interface with object creation module 24 including Delphi, Visual Basic, and C++ programming modules.

User systems 26 may also include a report writing module 30, an executive module 32, and a spreadsheet module 34. Report writing module 26 may comprise an OLAP report writer. Executive module 32 may comprise a module design tool for developing custom EIS applications. This module is a design tool for developing briefing books that provide high level users with a series of views that describe their business. Once created, end users can access briefing books through agent module 28 in EIS mode. Such a system is easily implemented with agent module 28 by compiling sets of analyses into dynamic pages that immediately focus users on their key business drivers. One embodiment of executive module 32 may comprise software known as DSS Executive™ offered by MicroStrategy.

Spreadsheet module 34 may comprise an add-on to existing spreadsheet programs or may comprise an entirely new spreadsheet program. Spreadsheet module 34 may enable reports and analyses generated from agent module 28 to be presented in a traditional spreadsheet program format to enable users to view results in preexisting front-end interfaces. Spreadsheet module 34 may comprise the Microsoft Excel™ spreadsheet program offered by Microsoft and/or an Excel™ Add-In program offered by MicroStrategy.

Another module for accessing content of server system 14 may comprise a network output module 22. Network output module 22 enables user system 26 access to server system 14 and data warehouse 12 without requiring an additional agent module 28 to be stored on user system 26. Instead, user system 26 may have a user interface module 38 residing thereon. User interface module 38 may comprise any module that enables a user system, such as user system 26, to interface with network output module 22 over a network 36. According to one embodiment of the invention, network 36 may comprise an intranet, the Internet or other developed Internet-type networks. Further, user interface module 38 may comprise any standard browser module such as Microsoft Internet Explorer™, Netscape Navigator™ or other. As many user systems 26 already have a user interface module 38 stored and operating thereon, network output module 22 offers the advantage of enabling users access to server system 14 and data warehouse 12 without learning to operate a new module such as agent module 28. One embodiment of network output module 22 may comprise a web-based module called DSS Web™ offered by MicroStrategy. Accordingly, in one embodiment, a user can access server system 14 through a standard web browser, such as Microsoft Internet Explorer™, or over the Internet through network output module 22, such as DSS Web™.

In this embodiment, network output module 22 may comprise a World Wide Web tool used in conjunction with server system 14 for allowing users to deploy data warehouse/decision support applications over the Internet using industry standard World Wide Web browsers as a client. As a result, a user can access the data warehouse with little or no client maintenance, little or no software to install, and only a small amount of additional training while still maintaining all of the capabilities of agent module 28. One embodiment of network output module 22 comprises DSS Web™ offered by MicroStrategy. This embodiment provides a broad array of options for viewing information sets, such as spreadsheet grids and a wide variety of graphs. Through this module's reporting capabilities, users receive key elements of a report in easily interpretable, plain language messages. This module also allows users to "drill" dynamically to a lower level of detail to view the underlying information or to create and save new analyses. For sensitive information, this module provides security plug-ins that allow the user to extend the standard security finctionality with additional user authentication routines. This module may also provide an API that allows users to customize, integrate, and imbed this functionality into other applications. For example, a data syndicator for health care information may utilize this module with a customized interface to sell access to health care information to Health Maintenance Organizations, hospitals, pharmacies, etc.

Other embodiments and uses of the invention will be apparent to those skilled in the art from consideration of the specification and practice of the invention disclosed herein. The specification and examples should be considered exemplary only. The scope of the invention is only limited by the claims appended hereto.

What is claimed is:

1. In a system for generation of output from an on-line analytical processing system to user output devices, a server system comprising:

service processing means for processing at least one scheduled service in an on-line analytical processing system according to a schedule established for the service and generating a service output, each service comprising at least one query to be performed by the on-line analytical processing system and at least one user device subscribed to that service;

service subscription means for enabling a plurality of subscribers to subscribe to the scheduled service and enabling the subscriber to specify at least one user output device at which to receive service outputs from the service processing means;

wherein each user output device subscribed to that service is associated with a device-specific style that designates the format in which that particular type of user output device receives service outputs to maintain integrity of the service output;

output determination means for determining whether to forward output from the service to each subscriber output device subscribed to the service;

output formatting means for creating a device-specific formatted output for each user device determined to receive output from the service by the output determination means, the output formatting means creating the device-specific formatted output according to a selection of predefined values specified for each of a plurality of predefined parameters, the output formatting means determining the selection of a value for each of the plurality of predefined parameters from the style specified for the user output device. each style thus providing a selection of a value for each of the predefined parameters; and output forwarding means for automatically forwarding a device-specific formatted service output to each of the user output devices selected by the output determining means to receive output;

wherein the output determination means determines whether each user device subscribed to the service is an alert subscription or a periodic subscription and selects the user device if it is a periodic subscription or if an alert condition specified in the alert subscription has been satisfied.

2. The server system of claim 1 wherein the predefined parameters comprise enclosure handling parameters that define how the user output device handles enclosures to the service output and text grid parameters that define how the user output device presents text that is presented in a grid.

3. The server system of claim 1 wherein the predefined parameters includes a parameter for segmenting a service output, the style for a particular device specifies a value as to how a service is to be segmented for the user output device, and the output formatting means further comprises segmenting means for segmenting the service output into multiple service outputs to be sent to one or more user output devices based on the style specified for that user output device.

4. The server system of claim 1 wherein at least one of the user output devices comprises an HTML mail system and the output formatting means formats the service output for delivery to the HTML mail system.

5. The server system of claim 1 wherein at least one of the user output devices comprises an audio system and the output formatting means formats the service output to deliver an audio version of the service output.

6. The server system of claim 1 wherein the output formatting means formats the service output into a natural language output format.

7. The server system of claim 1 wherein at least one of the user output devices comprises a particular type of pager and wherein the output formatting means formats the service output into a pager message using the style for the particular type of pager specified.

8. A method for generating output from an on-line analytical processing system to user output devices comprising the steps of:

processing at least one scheduled service in an on-line analytical processing system according to a schedule established for the service and generating a service output, each service comprising at least one query to be performed by the on-line analytical processing system and at least one user device subscribed to that service;

enabling a plurality of subscribers to subscribe to the scheduled service and enabling the subscriber to specify at least one user output device at which to receive service outputs from the service;

wherein each user device subscribed to that service is associated with a device-specific style that designates the format in which that particular type of user device is to output to the service outputs to a user to maintain the integrity of the service outputs;

determining whether to forward the generated output to one or more user devices based on output conditions specified for each user device subscribed to the service;

creating a device-specific formatted output for each user device subscribed to the service selected to receive the output according to a selection of predefined values specified for each of a plurality of predefined parameters provided by the style specified for the user output device, and automatically forwarding a device-specific formatted service output to each of the user output devices selected to receive the output for that service;

wherein the determining step comprises determining whether each user device subscribed to the service is an alert subscription or a periodic subscription and selecting the user device if it is a periodic subscription or if an alert condition specified in the alert subscription has been satisfied.

9. The method of claim 8 wherein the predefined parameters comprise enclosure handling parameters that define how the user output device handles enclosures to the service output and text grid parameters that define how the user output device presents text that is presented in a grid.

10. The method of claim 1 wherein the predefined parameters includes a parameter for segmenting a service output, the style for a particular device specifies a value as to how a service is to be segmented for the user output device, and further comprising the step of segmenting the service output into multiple service outputs to be sent to one or more user output device based on the style specified for that user output device.

11. The method of claim 8 wherein at least one of the user output devices comprises an HTML mail system and further comprising the step of formatting the service output for delivery to the HTML mail system.

12. The method of claim 8 wherein at least one of the user output devices comprises an audio system and further comprising the step of formatting the service output to deliver an audio version of the service output.

13. The method of claim 8 further comprising the step of formatting the service output into a natural language output format.

14. The method of claim 8 wherein at least one of the user output devices comprises a particular type of pager and further comprising the step of formatting the service output into a pager message using the style for the particular type of pager specified.

15. A medium having processor readable program code embodied therein for generating output from an on-line analytical processing system to user output devices, the processor readable code in the medium comprising:

service processing code for causing a processor to process at least one scheduled service according to the schedule established for the service in an on-line analytical processing system and generating a service output, each service comprising at least one query to be performed by the on-line analytical processing system and at least one user device subscribed to that service;

service subscribing code for causing a processor to enable a plurality of subscribers to subscribe to the scheduled service and enabling the subscriber to specify a user output device at which to receive a report from the service;

wherein each user device subscribed to that service is associated with a device-specific style that designates the format in which that particular type of user device is to output to the service output to a user to maintain the integrity of the service output;

determining code for causing a processor to determine whether to forward the generated output to one or more user devices based on output conditions specified for each user device subscribed to the service;

formatting code for causing a processor to create a device-specific formatted output for each user device subscribed to the service selected to receive the output according to a selection of predefined values specified for each of a plurality of predefined parameters provided by the style specified for the user output device;

forwarding code for causing a processor to forward a device-specific formatted service output to the user output devices selected to receive the output; and wherein the determining code determines whether each user device subscribed to the service is an alert subscription or a periodic subscription and selects the user device if it is a periodic subscription or if an alert condition specified in the alert subscription has been satisfied.

* * * * *

UNITED STATES PATENT AND TRADEMARK OFFICE
Certificate

Patent No. 6,260,050 B1                                                        Patented: July 10, 2001

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Michael J. Saylor, Vienna, VA; Kyle N. Yost, Arlington, VA; Peter G. Wilding, Denver, CO; and Robert G. Trenkamp, Annapolis, MD.

Signed and Sealed this Twenty-Second Day of July 2003.

JOSEPH H. FEILD
*Supervisory Patent Examiner*
Art Unit 2176

US006260050C1

(12) EX PARTE REEXAMINATION CERTIFICATE (4906th)
United States Patent
Saylor et al.

(10) Number: US 6,260,050 C1
(45) Certificate Issued: Feb. 10, 2004

(54) SYSTEM AND METHOD OF ADAPTING AUTOMATIC OUTPUT OF SERVICE RELATED OLAP REPORTS TO DISPARATE OUTPUT DEVICES

(75) Inventors: Michael J. Saylor, Vienna, VA (US); Kyle N. Yost, Arlington, VA (US); Peter G. Wilding, Denver, CO (US); Robert G. Trenkamp, Annapolis, MD (US)

(73) Assignee: Microstrategy Incorporated, McLean, VA (US)

Reexamination Request:
No. 90/006,206, Jan. 25, 2002
No. 90/006,596, Apr. 8, 2003

Reexamination Certificate for:
Patent No.: 6,260,050
Issued: Jul. 10, 2000
Appl. No.: 09/343,561
Filed: Jun. 30, 1999

Certificate of Correction issued Jul. 22, 2003.

Related U.S. Application Data
(60) Provisional application No. 60/126,055, filed on Mar. 23, 1999.

(51) Int. Cl.$^7$ ............................ G06F 3/00; G06F 15/16
(52) U.S. Cl. .................... 715/501.1; 709/200; 709/201; 709/232
(58) Field of Search ............................ 707/103 R, 103, 707/103 Y, 103 Z, 104.1, 1, 3; 715/501.1, 513, 531; 709/200, 201, 206, 232; 725/25

(56) References Cited

U.S. PATENT DOCUMENTS 6,260,050 B1    7/2001    Yost et al. ................ 707/501.1

OTHER PUBLICATIONS

MICROSTRATEGY: DSS broadcaster—the industry's first information broadcast server, M2 Presswire, Mar. 20, 1998. Available in Dow Jones Interactive, <http://www.djinteractive.com>. ("the UK DSS Broadcaster publication").

MICROSTRATEGY: DSS broadcaster—the industry's first information broadcast server, Mar. 23, 1998, <http://strategy.com/newsandevent/New/PressRelease/1998/broadcaster.htm>. Available in File History of U.S. Pat. No. 6,260,050 B1. (the US DSS Broadcaster publication).

Relational OLAP Server, MicroStrategy: DSS Server Brochure, 1996.

Relational OLAP Server, MicroStrategy: DSS Agent Brochure, 1996.

M. Kane, "Microsoft Acquires Hotmail," ZDNet News, Dec. 30, 1997. Available in <http://zdnet.com/2100-11-506679.html>.

*Primary Examiner*—Joseph H. Field

(57) ABSTRACT

A system for generation of output from an on-line analytical processing system to user output devices that comprises a service processor that processes at least one scheduled service in an on-line analytical processing system and generating a service output, each service comprising at least one query to be performed by the on4ine analytical processing system. The system then formats the service output according to styles specified for each user output device specified to receive that service output. The system then forwards the formatted service output to the user output devices specified for that service. The styles specified comprise a plurality of predefined parameters regarding the format for the service output for use by that user output device, including enclosure handling parameters and text grid parameters. The output may be formatted into multiple messages and may be formatted for an HTML mail system, an audio system, particular types of pager systems, electronic mail, web pages, mobile phones, telephones, facsimiles, personal digital assistants, and other electronic devices. A natural language formatting system may also be employed to generate natural language output.

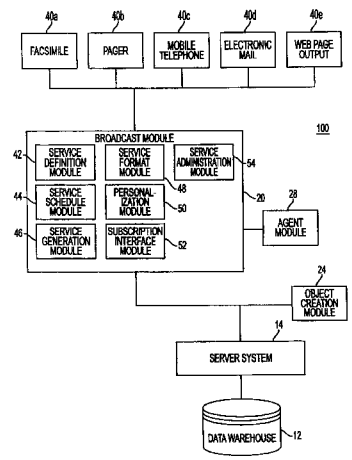

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–9 and 11–15 is confirmed.

Claim 10 is determined to be patentable as amended.

10. The method of claim [1] *8* wherein the predefined parameters includes a parameter for segmenting a service output, the style for a particular device specifies a value as to how a service is to be segmented for the user output device, and further comprising the step of segmenting the service output into multiple service outputs to be sent to one or more user output device based on the style specified for that user output device.

* * * * *